US009166473B2

(12) United States Patent
Groom et al.

(10) Patent No.: US 9,166,473 B2
(45) Date of Patent: Oct. 20, 2015

(54) DC/DC POWER CONVERTER WITH FEEDBACK CONTROL OPERABLE IN LINEAR AND NON-LINEAR MODES

(75) Inventors: Terry Groom, Lucas, TX (US); Shuo Chen, Dallas, TX (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 655 days.

(21) Appl. No.: 13/222,742

(22) Filed: Aug. 31, 2011

(65) Prior Publication Data

US 2013/0049715 A1    Feb. 28, 2013

(51) Int. Cl.
*H02M 3/156*    (2006.01)

(52) U.S. Cl.
CPC ...... *H02M 3/156* (2013.01); *H02M 2003/1566* (2013.01)

(58) Field of Classification Search
CPC ....... H02M 3/1588; H02M 3/156; G05F 1/56; G05F 1/757
USPC .................. 323/271, 274, 280, 282, 284, 351
See application file for complete search history.

(56) References Cited

U.S. PATENT DOCUMENTS

| 7,863,875 B1* | 1/2011 | Guo et al. ...................... 323/275 |
| 2002/0017897 A1* | 2/2002 | Wilcox et al. ................. 323/282 |
| 2010/0156375 A1* | 6/2010 | Bianco et al. ................. 323/283 |
| 2011/0210707 A1* | 9/2011 | Marsili et al. ................. 323/271 |

* cited by examiner

*Primary Examiner* — Fred E Finch, III
*Assistant Examiner* — Gustavo Rosario Benitez
(74) *Attorney, Agent, or Firm* — McDermott Will & Emery LLP

(57) ABSTRACT

A current mode power conversion system and method operates in cycles. Each cycle includes an on time and an off time. The system includes an inductor connected to store energy during the on time of each cycle and use the energy during the off time of each cycle. The system provides a stable output voltage and a maximum-limited output current to a load during constant load conditions. The system comprises a feedback control linearly operable so as to control the output voltage across the load during constant load conditions, and non-linearly operable so as to control the output voltage across the load during certain detected changes in load conditions as a function of the derivative of the current in the inductor so as to speed up the transient response of the power conversion system when a fault condition exists.

8 Claims, 4 Drawing Sheets

DC/DC POWER CONVERTER WITH FEEDBACK CONTROL OPERABLE IN LINEAR AND NON-LINEAR MODES

RELATED APPLICATION

This application is related to U.S. Ser. No. 12/561,912 filed Sep. 17, 2009 in the names of Johan Strydom and Yiding (Eric) Gu, assigned to the present assignee, and published on Mar. 17, 2011 as U.S. Pub. App. No. 2011/0062929, the disclosure of which is incorporated herein by reference.

FIELD OF THE DISCLOSURE

The present disclosure relates to DC/DC power converters, and more particularly to a DC/DC power conversion system having an improved transient response during a load change, both during step up and step down output current load transient conditions.

BACKGROUND OF THE DISCLOSURE

DC/DC converters have been popular in industry for many years. Current mode DC/DC power converters include various designs which have been used. Such designs include peak and valley current mode devices. These devices are turned on and off during each cycle at the frequency of operation. There are devices that operate so that either the "on" time (of each cycle) remains constant (on time control), or the off time (of each cycle) remains constant (off time control), i.e., control the duty cycle by controlling the on time or off time of each cycle of control.

These conventional systems normally include an energy storage device, usually in the form of an inductor, so that energy can be stored during the on time of each cycle and used during the off time of each cycle. The converter system is regulated usually by sensing the current through the inductor, not the current through the load. If there is a transient in the load, i.e., it is drawing either more or less current than it was, the converter wants to keep the load voltage constant, and must respond to the transient as quickly as possible. Because the converter senses the current information, it can provide accurate protection against over-current conditions. Converters can be peak or valley current architectures. Further, current mode converters are easy to compensate to insure a stable output when load conditions are stable, and therefore they are easy to use. Current mode controlled architectures provide a natural current limit and are stable over a wide range of input and output conditions. They are ideally suited for multiphase applications where current sharing and transient response is of greater importance. Increasing current limit beyond maximum load current allows headroom for improved response during transients at heavy load. This headroom however increases the size and rating requirement of the converter power components and leads to a reduced signal to noise ratio under nominal conditions.

Since current mode controlled DC/DC converters limit the output current, they thus act as a current source. During an output load change, initially the current is provided by output capacitors because no converter is fast enough for a sudden and rapid load change. The output will rise/fall depending on the difference between load and inductor current. The controller will sense this change in voltage and turn on the appropriate switch. In the case of the peak current mode controlled converter, the worse case happens when the output load increases right after the control switch has just turned off. The converter has to wait for the next clock pulse to turn on the control switch. For a sufficiently high bandwidth converter, this clock latency is the main reason for voltage droop during the transient response for this architecture. Similar latency issues exist in the other current mode architectures for different load transient conditions.

SUMMARY OF THE DISCLOSURE

It is desirable to improve the transient response of a current mode controlled DC/DC converter, but still keep the enormous benefits of current mode control. This improved transient response needs to also be beneficial to both constant on-time and off-time current mode architecture and improve the asymmetric transient response typically associated with these architectures.

Since this transient control mode improves clock latency, non-hysteric voltage mode controllers can also benefit from this approach.

The disclosure describes a process of power conversion and a current mode power conversion system constructed to provide a stable output voltage and a maximum-limited output current to a load. The system comprises a feedback control linearly operable so as to control the output voltage across the load during constant load conditions, and non-linearly operable so as to control the output voltage across the load during certain detected changes in load conditions as a function of the derivative of the current in the inductor so as to speed up the transient response of the power conversion system when a fault condition exists.

GENERAL DESCRIPTION OF THE DRAWINGS

DETAILED DESCRIPTION OF THE DRAWINGS

Figure 1:
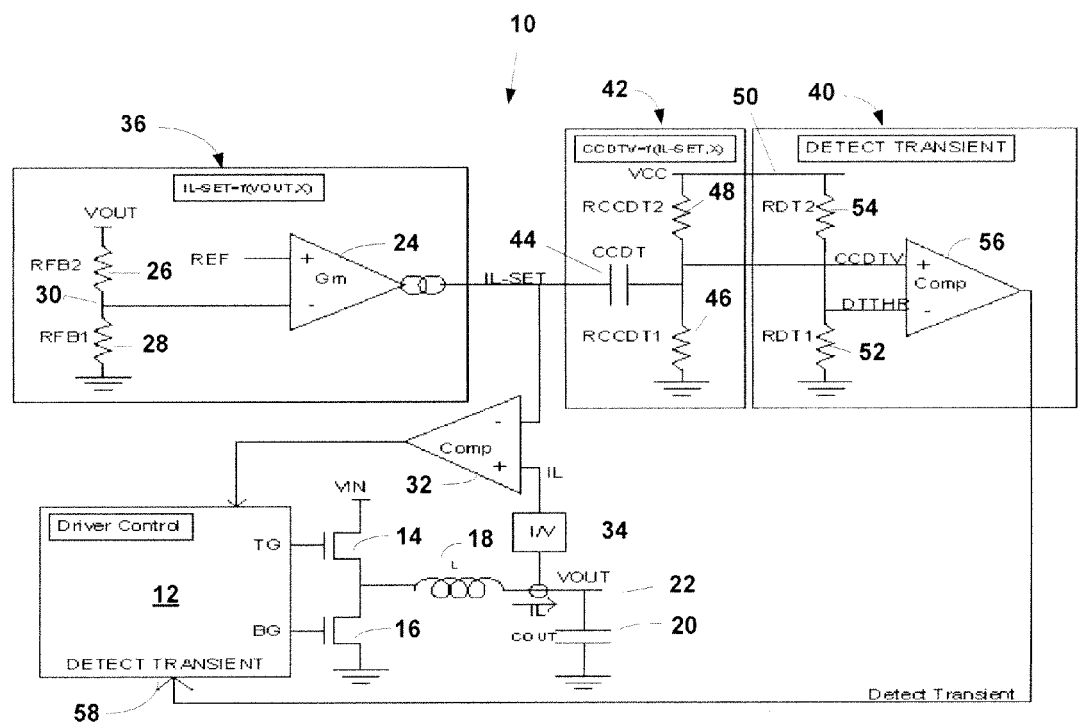
FIG. 1 shows one embodiment of an architecture of a DC/DC power converter incorporating improved feedback control utilizing a transconductance amplifier.

The embodiments described herein each detect a load transient in a simple and timely manner that requires no additional external sensing circuitry/components or additional IC pins. The embodiments also provide a dual mode of control that operates either in a linear mode during non-transient conditions, and a nonlinear mode during load transient conditions providing an improved transient response. Further, the embodiment allows for a simple adjustment of the threshold for mode transition between linear and non-linear control modes. Finally, the embodiments include a nonlinear control aspect that shortens the nonlinear control duration, by speeding up the linear circuit response while the non-linear control circuit is in command.

The illustrated embodiments of FIGS. 1-4 each show a current mode, constant on-time, valley mode controller which have been modified accordingly, but it should be understood that the improvements will apply to any current mode controller including peak current (senses up ramp for maximum value), valley current (senses down ramp for minimum value) and average current (average of the maximum and minimum)

converter systems. Peak and valley converters assume that the operating frequency remains constant. There are also converters that operate so that either the on time remains constant (for constant on-time control), or the off time remains constant (for constant off-time control), i.e., control the duty cycle by controlling the on time or off time of the on switch. These improvements will apply to these constant on/off time controllers as well.

The illustrated embodiments sense the current in the system (i.e., through the inductor), not the current through the load. If there is a transient in the load (i.e., it is drawing either more or less current than it was), the converter will try to keep the load voltage constant, and will respond to the transient as quickly as possible. However, with a fixed frequency controller (peak or valley type), there is an inherent latency to the response to the transient because prior art constant frequency peak and valley devices only make a decision once a clock cycle. The same is true for constant on/off time controllers as well. In the case of constant on/off time while there is no clock latency, there is latency due to the fixed on time and fixed off time before the switch can be turned either off or on, respectively In describing speed as applied to DC/DC converters it is important to understand what a converter does. Speed is how quickly the control system power output changes in response to a change in load. Specifically in a DC/DC converter this is how quickly the inductor current can change. This system detects a transient event and overrides the control system to react immediately to a change in load without control system latency. It is the non-linear override based on detection of a transient event which improves the converters reaction time or speed. Since this is a non-linear system it does not matter what the control system is which is being overridden. All that is required is a node proportional to the inductor current setpoint which is found in any current mode control system.

Note that the converter will try to keep the output voltage constant regardless of how much output current is required. Every time there is a change in load current the converter needs to adjust and the output voltage will have some fluctuation on it. This is referred to as the transient response of the converter output voltage. It is desirable to minimize the fluctuations in the output voltage.

The embodiment shown in each of FIGS. 1-4 improves the transient control mode by eliminating control latency. The transient control mode is an override of steady state control system based on detecting that a transient event has occurred. Any control latency due to any cause, either clock, on time or off time is therefore eliminated as a result of the transient override. In each embodiment, the converter includes a feedback control linearly operable so as to control the output voltage across the load during constant load conditions, and non-linearly control operable so as to control the output voltage across the load during certain detected changes in load conditions as a function of the derivative of the current in the inductor so as to speed up the transient response of the power conversion system when a fault condition exists. Each embodiment includes a transient detector for detecting transients that exceed a predetermined threshold that can be set.

Referring to FIG. 1, DC/DC converter 10 is shown in block form and can be include any type of driver control 12 that is used in DC/DC converters. Driver control 12 can be any power conversion system which measures inductor current, and has an internal node proportional to the inductor current setpoint. Such converters typically apply the input voltage VIN to a first terminal of switch 14 (hereinafter referred to as the "top" switch), which in turn has its second terminal connected to the first terminal of switch 16 (hereinafter referred to as the "bottom" switch). The second terminal of bottom switch 16 is typically coupled to system ground. As shown the switches are shown as FETs, but may take other forms. The control terminals are gates, so that the TG output of driver control 12 is connected to a gate of top switch 14 so as to control the on-off state of switch 14. Similarly the BG output of driver control 12 is connected to the gate of bottom switch 16 so as to control the on-off state of switch 16. Current mode DC/DC converters also include an energy storage element (typically an inductor or a transformer), which is shown as an inductor 18 connected to the node between the two switches 14 and 16. The output current of the converter flows to the output of the converter, shown as 22, which provides an output voltage VOUT across the output capacitor 20.

In this embodiment, converter 10 includes transconductance (Gm) amplifier 24 arranged to generate a control setpoint voltage IL-SET . . . . As is well know a transconductance amplifier functions as a voltage controlled current source, generating a current as a function of the difference between two voltages applied to its inputs. As shown, VOUT appears, or is replicated across, resistor divider network comprising feedback resistors (RFB1) 26 and (RFB2) 28. The junction 30 between the two feedback resistors is connected to the inverting input of Gm amplifier 24. This voltage is compared to a reference voltage REF applied to the non-inverting input of the Gm amplifier 24. Gm amplifier 24 generates a current IL-SET as a function of difference between the two input voltages. As will be more evident hereinafter, IL-SET is not limited to a linear function of VOUT or any other input variable used to determine IL-SET. The output of Gm amplifier 24 represents an inductor current set point IL-SET is applied to the inverting input of comparator 32. A signal generated by a voltage to current converter 34 is applied to the non-inverting terminal of comparator 32 representing the sensed current IL flowing through the inductor 18. The output of the comparator 32 is thus a function of the difference between the two input signals and is applied to the driver control 12, for controlling the operation of the upper and lower switches 14 and 16 so as to control the drive to the energy storage device shown as inductor 18. So long as the inductor current IL is greater than IL-SET the driver control operates in a linear mode consistent with normal operating conditions.

A detect transient block 40 is provided to detect a transient as a function of the derivative of the inductor current flowing through inductor 18. The detect transient block 40 requires that IL-SET or an equivalent internal node proportional to the inductor current set point is available to be measured. A block 42 is provided to adjust the time constant and threshold detection of the transient detection. In the embodiment of FIG. 1, circuit 42 includes an input capacitor (CCDT) 44, coupled to the center node of the impedance network comprising resistors (RCCDT1) 46 and (RCCDT2) 48 forming a voltage divider connected between a control voltage source VCC 50 and system ground. Capacitor 44 and resistor 46 are provided so as to generate a signal representing the derivative of the IL-SET current signal. In this embodiment, the capacitor 44 and resistor 46 are provided to isolate the derivative of the signal IL-SET. The derivative signal output of circuit 42 is CCDTV, which is applied to the non-inverting input of comparator 56 of the detect transient block 40, with the inverting input of converter being connected to a reference voltage DTTHR provided at the center node of a second impedance network comprising the resistors (RDT1) 52 and (RDT2) 54, connected between the control voltage source 50 and system ground. The reference voltage (DTTHR) applied to the inverting input of the comparator 56 establishes the threshold level of the magnitude of the transient that will trigger the nonlinear feed back detect transient signal indicated at the output of the comparator 56. Resistors 52 and 54 form a resistor divider to scale the derivative signal CCDTV to make it proportional to the reference signal DTTHR. The output of the comparator 56 is coupled to the detect transient input 58 of the control 12 through a feedback path labeled "detect transient."

In the embodiment of FIG. 1, in the current set block 36, the current representative of the inductor current set value IL-SET is provided from the node between resistors 26 and 28 is applied to the inverting input of the Gm amplifier 24. This current is compared to a reference signal REF. The current IL-SET is thus a function of the inductor current. IL-SET is a DC signal that does not vary much under normal load conditions. However, when there is a load increase (load step) or a load decrease (load release), there will be an initial transient at the node 30, which in turn causes a transient at the inverting input of the transconductance amplifier 24. The transient in IL-SET will appear across the capacitor 44 to the impedance network comprised of resistors 46 and 48, and is a function of the derivative of the inductor current.

As shown, the impedance network formed by capacitor 44 and resistors 46 and 48 provides a DC voltage (CCDTV) as a function of the derivative of the inductor current that enables the detect transient block 40. The signal is compared to a reference signal formed by the network resistor divider formed by resistors 52 and 54 (DTTHR). The difference between the two signals is referred to as a "delta".

FIG. 1 is a more generalized illustration of the how the circuit is configured for detecting signals above or below a threshold level so that it can be used to detect step loads or step releases. It should be noted that the controller 10 can be configured to detect when signal CCDTV is above the threshold DTTHR (a positive Delta threshold), or below the threshold DTTHR (a negative delta threshold) by simple changes to the architecture, such as described hereinafter. Some embodiments discussed below are configured to do one or the other.

IL-SET is essentially corresponds to the set point of the inductor current. If the converter is operating in a steady state condition, and there is a change in the load RFB1 and RFB2 ("load release" is when the load goes from one value to a lesser value), the change is detected by sensing a change in CCDTV relative to DTTHR. The converter can also be configured to detect a "load step" when the load goes from one steady state value to a greater value relative to the threshold value (DTTHR) that is set. The comparator 56 thus compares two current levels, and depending on the configuration it can detect an increase in load (a load step) (a transient high), or a decrease in load (a load release) (a transient low). Thus, FIG. 1 is a more general implementation of the circuit in which you can detect either a transient high or a transient low.

Comparator 32 is used as a part of the normal pulse width modulation (PWM) operation of a DC/DC converter. In a current mode controller the inductor current with a set point current, and that is what comparator 32 provides from the feedback of the signal sensed at node 30, the feedback signal IL-SET signal provided by block 36. Thus, so long as the inductor current IL is below the setpoint IL-SET indicating normal operating conditions, the converter 32 will provide a signal to the driver control 12 enabling linear operation of the converter. When a transient is detected, and the feedback signal output DETECT TRANSIENT is provided to the driver control 12 so as to change from linear to non-linear control to speed up the response. The circuit thus simply detects the first derivative of the inductor current in order to determine whether a transient has occurred, and if so, change to a nonlinear control operation.

The block 42 detects the inductor current at the output (the junction between resistors 26 an 28 through the capacitor 44 and resistors 46 and 48. This is accomplished with the resistor divider formed by resistors 26 and 28 that provides a voltage to the inverting input of the Gm amplifier proportional to the inductor current IL. If that delta moves beyond the threshold represented by the DTTHR, then a transient is detected. The circuit is easy to implement, simply by providing the appropriate capacitor 44 and resistors 46 and 48. And the resistor divider formed by 52 and 54 establishes the threshold DTTHR.

Figure 2:
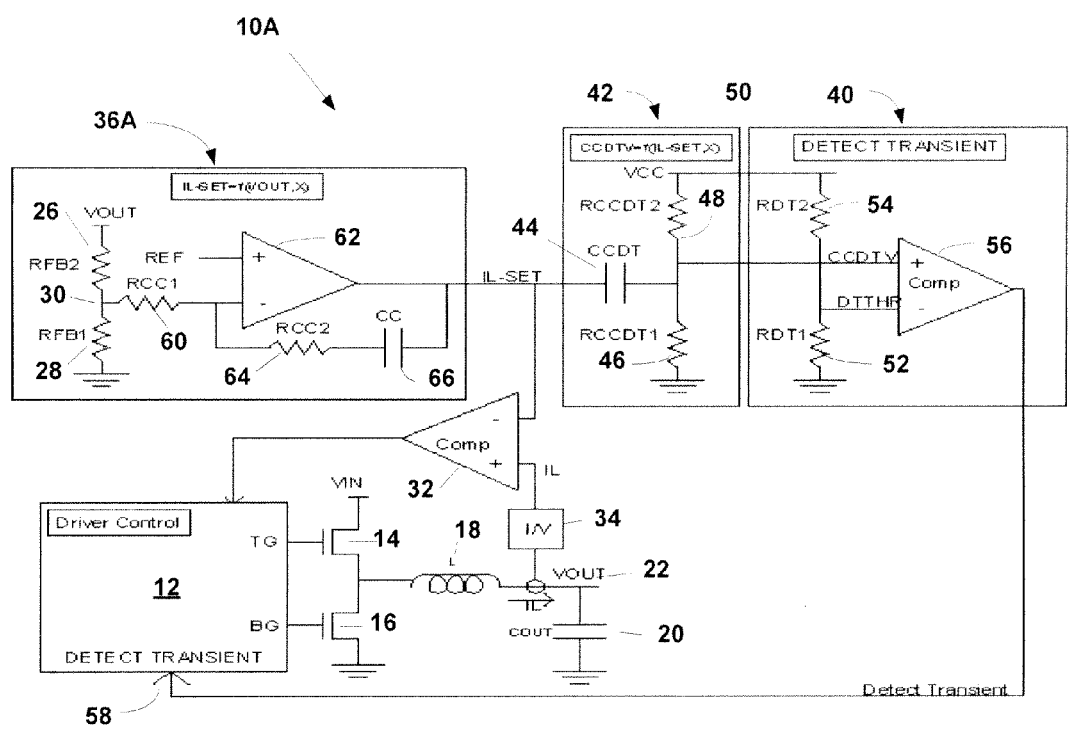
FIG. 2 shows a second embodiment of an architecture of a DC/DC power converter incorporating improved feedback control utilizing an inverting error amplifier.

FIG. 2 illustrates an alternative arrangement in which a gain block is substituted for the transconductance amplifier Gm 24 of the block 36 of FIG. 1. In FIG. 2, the inductor current set block 36A of the converter 10A provides a voltage detected at node 30 of the network resistor divider formed by resistors 26 and 28. The voltage at node 30 is applied to input resistor 60 forming an input to the inverting input of operational amplifier 62. The non-inverting input of amplifier is connected to a reference voltage REF, while the output of the amplifier is connected to the inverting input through a feedback path formed by feedback resistor 64 connected in series with capacitor 66, and provides the IL-SET signal to the capacitor 44 of block 42 and the non-inverting input of the comparator 32. The operational amplifier 62 and its feedback configuration forms an inverting error amplifier configured to generate IL-SET. Like FIG. 1, block 36A monitors the signal at node 30 and provides an output signal representing the inductor current set point, IL-SET. Thus, so long as the inductor current IL is below the setpoint IL-SET indicating normal operating conditions, the comparator 32 will provide a signal to the driver control 12 enabling linear operation of the converter. When a transient is detected, and the feedback signal output DETECT TRANSIENT is provided to the driver control 12 so as to change from linear to non-linear control to speed up the response. The circuit thus simply detects the first derivative of the inductor current in order to determine whether a transient has occurred, and if so, change to a non-linear control operation.

Figure 3:
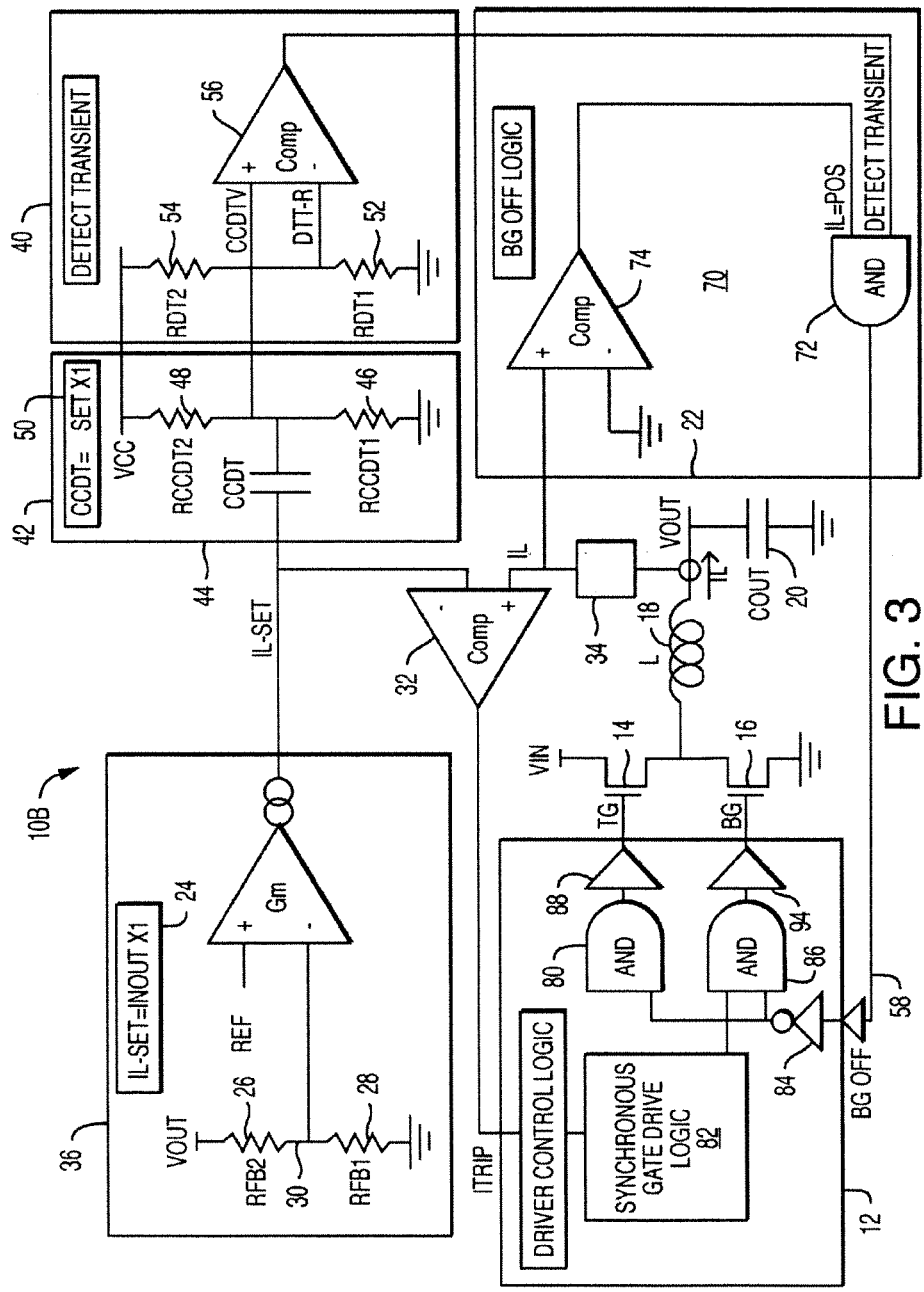
FIG. 3 shows a third embodiment of an architecture of a DC/DC power converter incorporating improved feedback control utilizing an inverting amplifier.
Figure 4:
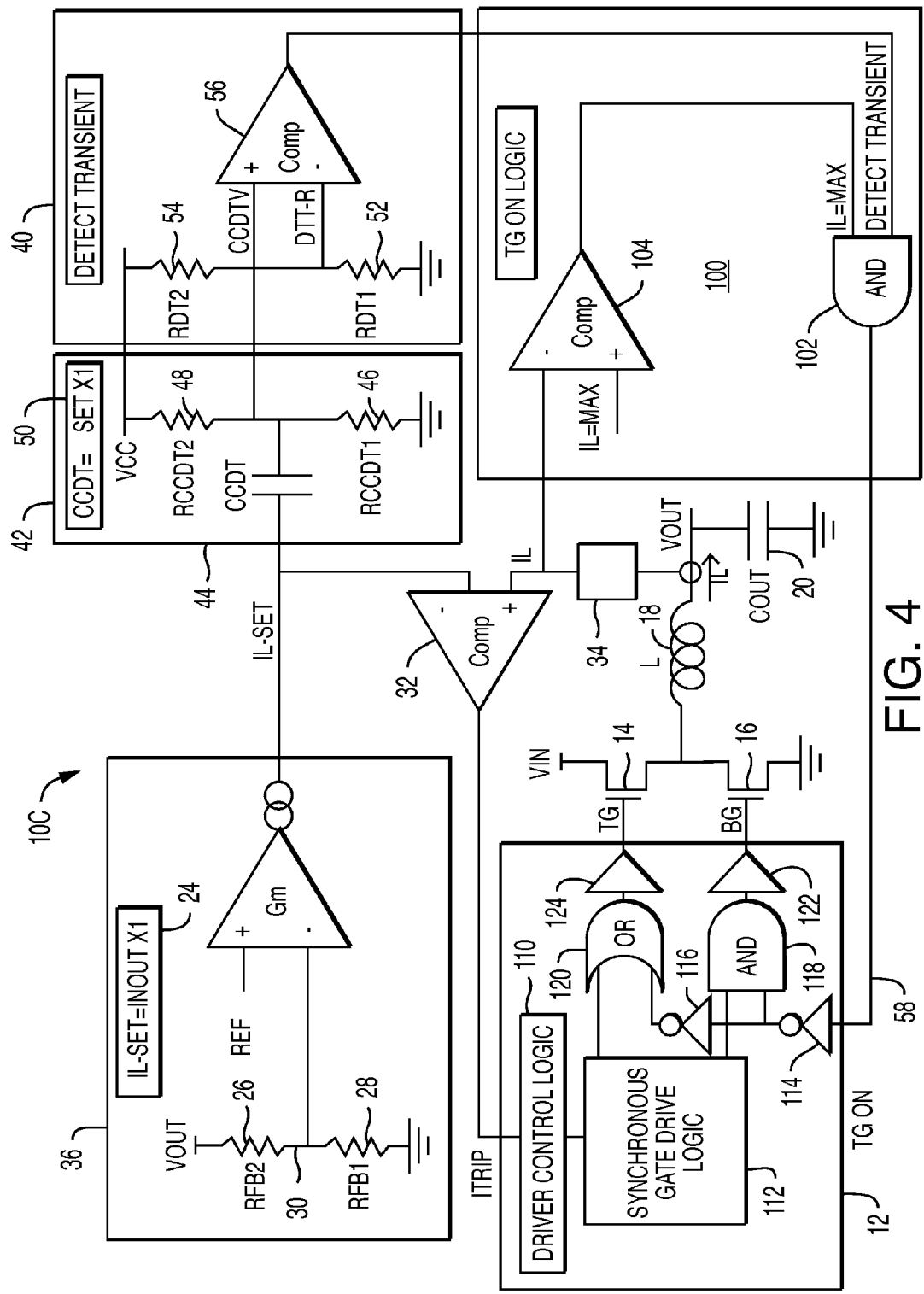
FIG. 4 shows a fourth embodiment of an architecture of a DC/DC power converter incorporating improved feedback control utilizing an inverting amplifier.

FIGS. 3 and 4 show two exemplary embodiments, one configured to detect load release and the other to detect load step. Referring first to FIG. 3, the converter 10B is configured to turn off the bottom FET switch 16 of the converter when a load release is detected. Specifically, the output of the comparator 56 of the block 40 is applied to the BG Off Logic block 70. Block 70 includes an AND gate 72 and a comparator 74. Comparator 74 has its non-inverting input connected to receive a signal representing the inductor current IL at the output of current to voltage converter 34. The inverting input of comparator 74 is connected to a source (e.g. system ground), representing the inductor current when at zero value. The output of the comparator is thus a logic high value so long as the inductor current IL is greater than zero. The output of comparator 74 is coupled to one input of AND gate 72. A second input of AND gate 72 is connected to receive the output of block 40 indicating that a transient has occurred. The output of AND gate is applied to the transient detection input 58 of driver control 12. The driver control is configured so that when the AND gate provides a logic high signal (indicating that the inductor current IL has gone positive, i.e., is more positive than zero) and that a transient has been detected, the non-linear control of driver control 12 is enabled.

An example of a configuration that can provide the adequate control over the inductor current when switching between the linear mode of control and the nonlinear mode of control is also shown, by way of example, in FIG. 3. In FIG. 3, the driver control 12 is shown as including the driver control logic 80 connected to the synchronous gate drive logic 82. Synchronous gate drive logic 82 provides an output to an input of each of the AND gates 86 and 88. The transient detect input 58 is connected to an inverter 84, which in turn is connected to the other input of each of the AND gates 86 and 88. As arranged, when the inductor current IL goes positive and a transient is detected from block 40, the output from block 70 provides a signal to the transient detect input 58 of control block 12, which in turn provides a change in the gate voltage applied to the bottom gate of FET switch 16. This results in switch 16 turning off, causing the converter to start nonlinear control of the pulse width modulator prior to the ending of a cycle. But if the inductor current drops to zero or below, or the CCDTV signal goes above the threshold DTTHR, the AND gate will then be disabled, and the linear control of the pulse width modulator one again takes over. Thus, non-linear control is not enabled unless there is a transient, and the inductor current goes positive.

Referring to FIG. 4, the converter is configured to turn on the top FET switch 14 of the converter 10C when a load step is detected. In this case, a TG ON Logic block 100 is provided and configured to receive the output of the transient detect block 40. Block 100 also includes an AND gate and a comparator. AND gate 102 has one of its inputs connected to receive the output of comparator 56 of transient detect block 40 and the other input connected to receive the output of the comparator 104. In this case the comparator 104 is configured differently form FIG. 3, wherein with the inductor current IL is applied to the inverting input of the comparator 104, with the non-inverting input of comparator being connected to receive a signal representing the maximum value of the inductor current. In this case, the output of the TG ON Logic block 100 is connected to the transient detect input 58 of the driver control 12. Transient detect input 58 is connected to the input of inverter 114, which in turn is applied to an input of AND gate 118 and to an input of a second inverter 116. The inverter 116 has its output connected to an input of OR gate 120. Control 12 includes driver control logic 110, connected to the synchronous gate drive logic 112, which in turn provides an input to AND gate 118 and an input to OR gate 120. The outputs of AND gate 118 and OR gate 120 are respectively connected to amplifiers 122 and 124, which are correspondingly connected to the bottom gate (BG) of switch 16 and top gate (TG) of switch 14.

In the case of the configuration shown in FIG. 4, the signal CCDTV is biased to be less than the established threshold DTTHR during normal conditions. For load step, the difference between CCDTV and DTTR is set to be negative in order to detect a transient load step. When a load step occurs, a signal is typically created when the IL-SET point changes, for example, by >30% positive based on a percentage of full scale load current . . . . Also the comparator 104 of the TB ON Logic block 100 detects the inductor current IL and compares it to a maximum current reference signal IL=MAX. IL=MAX can be the current limit, but can be set to any desired current level for whatever metric that might be desired. In this way, the reference signal can be programmed for the particular application. When the AND gate 102 of the TG ON Logic block 100 is enabled, the nonlinear control takes over by turning on the top FET switch 14.

Thus, in FIG. 4, the comparator 104 monitors IL to see if it is greater than the value set by IL=MAX. If IL is greater that IL=MAX, then the teecat transient is defeated. IL=MAX must at a minimum be equal to the controller current limit and can be set to lower vales for various reasons to improve transient performance. Overriding the detect transient by monitoring the measured inductor current allows full control in normal operation or fault condition. Measuring inductor current is a means of distinguishing a normal transient condition and a fault condition. When a transient load step is detected the signal is then sent to the gate driver controller. In the most basic form this signal is used to bias the gate of the top gate FET switch 14. Such biasing forces the top switch 14 to an ON state so as to extend the ON time independent of any other control inputs. This feature has different levels of benefit depending on the control method. The objective is to override the normal (linear) control function, and immediately turn on the top switch when a normal operation transient load step is detected and no fault condition exists.

It should be noted that the illustrated configurations detect certain changes in the inductor current, but at the same time must be compliant with other false conditions that might occur. As described the configurations all enable nonlinear control when both a transient condition and a fault condition occur. All of the embodiments use VOUT, such that IL-SET is a function of VOUT. In the examples shown, CCDTV is a function of IL-SET compared to a threshold reference signal (DTTHR). And in its simplest implementation, CCDTV is a function of the first derivative of the inductor current. It should be noted that there could be other variables. As described, once linear control is turned off, one can let the device run free will, or keep the control on until the current exceeds the maximum. Further, the configurations described utilizing a voltage CCDTV that is proportional to inductor current (IL-SET and IL). Further, while a transconductance amplifier Gm is utilized in FIGS. 1, 3 and 4, as shown in FIG. 2, a transconductance amplifier is not necessary to achieve the advantages of the improvements described herein.

It is also noted that the converter circuit does not necessarily have to use a resistor divider and the signal CCDTV does not have to be derived from Vcc. All that is necessary is that CCDTV be a DC biased signal, and DTTHR be a DC reference voltage. For example, a single resistor RCCDT1 could be connected to a bias voltage. Similarly, DTTHR could be connected directly to a reference voltage without the need for a voltage divider. Further, although the circuits illustrated in FIGS. 1-4 are shown as analog, the circuits can also be implemented digital form or a combination of analog and digital to look at a (digital) signal representing the value of the delta and comparing the (digital) value of the delta to a (digital) value of the threshold.

The foregoing describes a power converter that improves the transient response of a current mode controlled DC/DC converter, but still retains the enormous benefits of current mode control. The disclosure describes a process of power conversion and a current mode power conversion system constructed to provide a stable output voltage and a maximum-limited output current to a load.

While the present disclosure illustrates and describes particular embodiments, it will be appreciated that numerous changes and modifications will occur to those skilled in the art. Accordingly, it is intended that the appended claims cover all those changes and modifications which fall within the spirit and scope of the present disclosure.

What is claimed is:

1. A current mode power conversion system that operates in cycles, each cycle including an on time and an off time, the system including an inductor having a set point current and a control loop that regulates measured inductor current to equal the set point current and connected to store energy during the on time of each cycle and use the energy during the off time of each cycle, the system providing a stable output voltage and a maximum limited output current to a load during constant load conditions, the system comprising:
- a feedback control linearly operable so as to control the output voltage across the load during constant load conditions, and non-linearly operable so as to control the output voltage across the load during certain detected changes in the inductor current set point so as to speed up the transient response of the power conversion system, the feedback control including:
- a circuit for producing a first signal as a function of a difference between a reference voltage and a signal proportional to the output voltage, the first signal representing the inductor current set point,
- a circuit for producing a derivative signal representing the derivative of the first signal, and a transient detector configured for detecting a change in the set point current of the inductor, wherein the feedback control is responsive to the transient detector for switching from linear operation to nonlinear operation when a threshold detector detects a change in the inductor current set point that has a magnitude that exceeds the threshold.

2. A current mode power conversion system according to claim 1, wherein the change in load condition includes a load release.

3. A current mode power conversion system according to claim 1, wherein the change in load condition includes a load step.

4. A current mode power conversion system according to claim 1, wherein feedback control includes a first amplifier configured to generate a signal representing the current through the inductor, and the transient detector is configured to generate a control signal as a function of the first derivative of the current in the inductor.

5. A current mode power conversion system according to claim 4, wherein the first amplifier is a transconductance amplifier.

6. A current mode power conversion system according to claim 4, wherein the first amplifier is a comparator.

7. A current mode power conversion system according to claim 1, wherein the threshold detector is constructed and arranged so as to detect changes in the derivative signal when it drops below the predetermined threshold.

8. A current mode power conversion system according to claim 1, wherein the threshold detector is constructed and arranged so as to detect changes in load conditions that rise above the predetermined threshold.

* * * * *